Sept. 22, 1936. A. SOMMER Re. 20,119
METHOD AND APPARATUS FOR PRODUCING PULVERULENT BUILDING MATERIAL WITH BITUMINOUS CONSTITUENTS
Original Filed Oct. 27, 1933
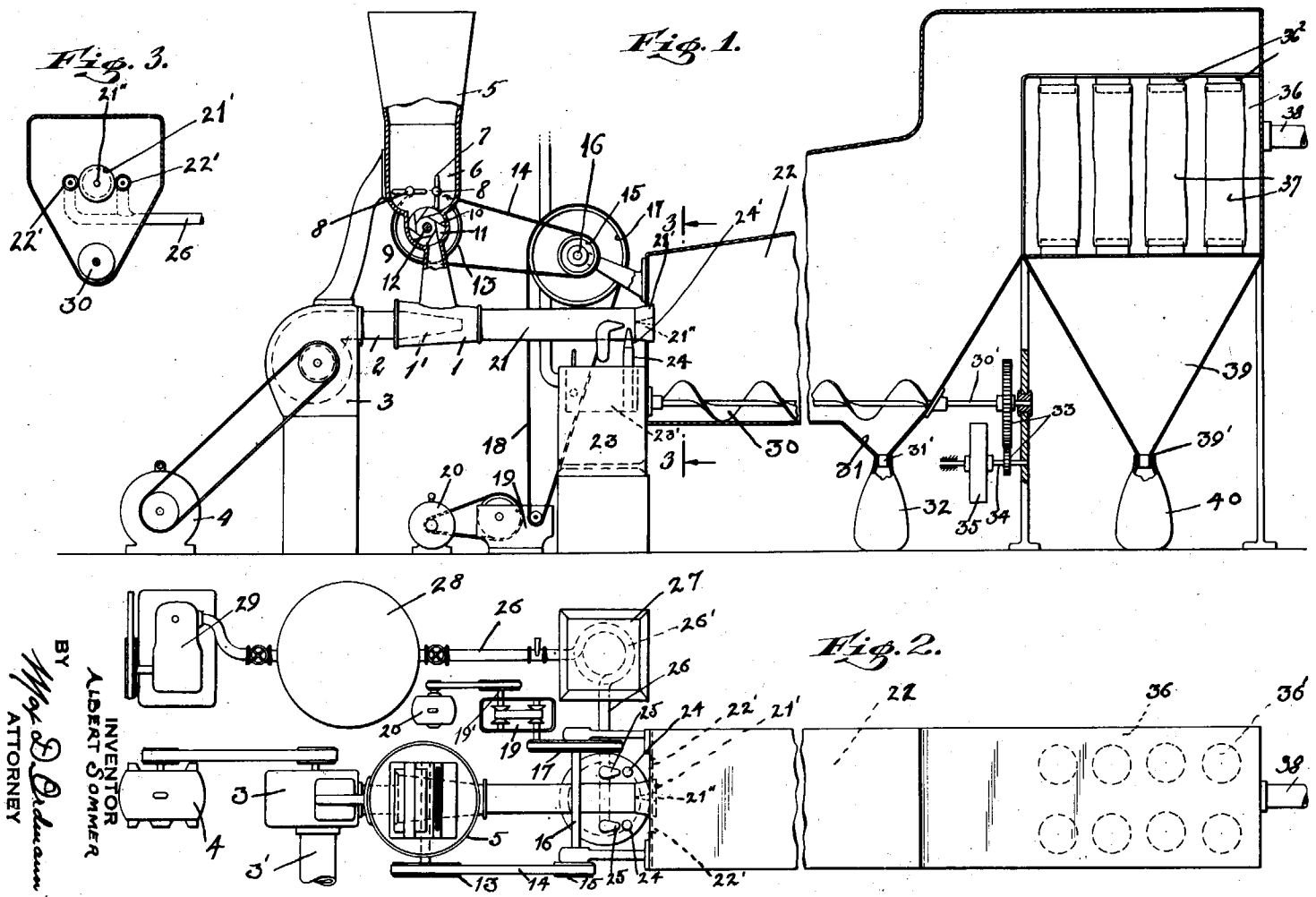
INVENTOR
ALBERT SOMMER
BY Max D. Ordmann
ATTORNEY Reissued Sept. 22, 1936 Re. 20,119

UNITED STATES PATENT OFFICE 20,119

METHOD AND APPARATUS FOR PRODUCING PULVERULENT BUILDING MATERIAL WITH BITUMINOUS CONSTITUENTS

Albert Sommer, Zurich, Switzerland, assignor to T. R. C. Corporation, Wilmington, Del., a corporation of Delaware Original No. 1,989,892, dated February 5, 1935, Serial No. 695,485, October 27, 1933. Application for reissue October 24, 1935, Serial No. 46,600

18 Claims. (Cl. 94—43)

This application is a continuation in part of my applications Serial #610,973, filed May 12, 1932, Serial #689,565, filed September 15, 1933 and Ser. #672,865 filed May 25, 1933.

This invention relates to a method and means for producing a pulverulent binder containing bituminous materials and using preferably cement, lime or the like.

The object of my invention is to provide a method and an apparatus whereby the materials used may be so treated that each individual particle of the hydraulic base material will be covered with a fine film of bituminous material so that the final product will be a powder very much like the base material. Thus, for instance, if Portland cement be used as base, the final product, notwithstanding its bituminous contents, will, like Portland cement, pass through a 10,000 mesh sieve without leaving an appreciable amount of residue.

Accordingly, an essential feature of my new apparatus is the provision of an injector tube, for the pulverulent hydraulic material, of a certain diameter, extending horizontally through a compressed air operated exhaust and terminating in a closed collector, whereby the said material will be injected into the chamber in form of a mist or cloud. Coordinated with said injector tube are nozzles for atomizing the liquefied bituminous material in such a manner that the direction of the atomized material produced by the injector nozzles coincides with the longitudinal direction of the feed tube for the hydraulic material.

I am aware that it is known to atomize cement or the like by means of an injector and to mix with it water, also through an injector so as to produce a liquid pulp to be squirted onto walls or the like to be plastered. I am also aware that mortar, such as a mixture of cement, sand and water, has been treated by a squirting process in like manner.

My invention, however, is not concerned with a squirting process, but with the production of a pulverulent product, the individual particles of which consisting of hydraulic material, are covered with a misty film of bituminous material. This I accomplish by producing in a closed chamber two clouds which are caused to combine in such a manner that the cloud of bituminous material is deposited onto the cloud of the pulverulent hydraulic binding material in form of a very thin film.

Two diametrically opposed atomizing nozzles for the liquefied bituminous material are advantageously arranged about flush with the central line of the feed pipe for the pulverulent material and adjacent the discharge nozzle of said feed pipe so that two clouds are sure to form which will effectively and intimately mix.

The atomizing device for the liquified bituminous material comprises a tube submerged in the liquid to be atomized and a second tube arranged at a right angle thereto for heated compressed air. The compressed air produced in a compressor and stored in a reservoir is conveyed through heated coils, as a result of which the bituminous material will be completely changed into a fog or a cloud.

In themselves the atomization of bituminous material and the blowing of same against pulverulent material are known. Thus, for instance, it is known to blow pulverulent material into a mixing vessel and to mix it with pulverized bituminous material blown into it from the opposite direction. But with such a process the object is to enrich poor asphalt rock with bitumen or to form briquettes by utilizing the viscous properties of the bituminous material. For such purpose the ordinary squirting nozzle may be used, as it suffices to disperse coarse bituminous material under pressure. With the present invention, however, the viscous property of the bitumen is disregarded, the main object being to produce a bituminous cement powder.

The new apparatus is equipped with means for effectively heating the compressed air passing through the atomizing nozzles, means for evenly distributing the materials in the collecting chamber and means for directing the air current so that an intimate mixing of both materials is obtained.

My invention will be more fully understood by reference to the accompanying drawing in which similar reference characters denote corresponding parts and in which, Fig. 1 is a front elevation partly in section of my apparatus;

Fig. 2 is a plan view thereof; and

Fig. 3 is a vertical cross section on line III—III of Fig. 1.

Referring in detail to the drawing 1 denotes the injector into which projects a nozzle 1′ formed on a tube 2 leading from a ventilator 3 or the like driven by an electric motor 4. The storage receptacle 5 for the pulverulent material, such as cement, lime or the like, opens into a chamber 6 in which are provided beaters or stirrers 7 mounted on a driven shaft 8. At the bottom of the chamber 6 is a distributor 9 comprising a drum 11 mounted on a shaft 12 and formed with blades 10. This shaft 12 is driven by means of belt 14 and pulleys 13 and 15, the pulley 15 being mounted on a shaft 16 carrying a pulley 17 which by belt 18 is connected to a speed change gear 19. The shaft 19' of said gear 19 is driven from an electro-motor 20. The material evenly passing from the distributor 9 into the injector 1 is drawn by the air current passing through the nozzle 1' and is then, through tube 21 leading from the injector 1, blown into the chamber 22 through a conical mouthpiece 21' formed at the end of said feed tube 21 and in which a distributing cone 21'' is mounted.

Adjacent to chamber 22 is a heating device 23 for heating the bituminous substance. Projecting into the heating vessel 23' thereof are two vertical tubes 24 which project outwardly and terminate in nozzles 24'. At right angles to said nozzles 24' are hot air nozzles 25 which in co-operation with nozzles 24', in well known manner, will cause the atomization of said liquid bituminous material and will blow it into the chamber 22 through two openings 22' provided in the wall of the latter at both sides of the mouthpiece 21'. The hot air nozzles communicate with a tube 26 which leads through a reservoir 28 to a compressor 29. The flow of air through tube 26 can be controlled by throttle and stop valves.

The pulverulent material blown into the chamber 22 becomes intimately mixed with the atomized bituminous material, and by providing suitable drafts in the mouthpiece 21' it is possible to transform the pulverulent material into a conical cloud. The cement or lime particles which in the chamber 22 become covered with a film of bituminous matter drop to the bottom of said chamber and are from here led by a worm conveyor 30 to the collecting funnel 31. To the mouth end 31' of said collector is fixed a bag 32 for receiving the product. The shaft 30' of the worm conveyor is driven through gears 33 from shaft 34 which through pulley 35 and belt is driven from an electro-motor or the like (not shown). At the end of chamber 22 I provide an air filtering chamber 36, whose top and bottom are provided with apertures 36' to the edges 36² of which are fixed filtering bags 37. A pipe 38 leads from the air filter 36 to an exhaust (not shown) which sucks up the air. The pipe 38 may, however, be connected to the pipe 3' of the exhaust 3 to produce air circulation. The matter left over in the air filter 36 drops into the funnel 39 and through the discharge 39' thereof is collected in the bag 40 fixed thereto.

At the bottom of the filtering chamber 36 there may be a worm conveyor (not shown) to transfer the material back to funnel 31.

In the foregoing I have described one modification of my invention. It is, of course, obvious that various changes may be made in the construction without departing from the principle of my invention and I, therefore, do not wish to restrict myself to the details of construction shown and described.

What I claim is:

1. An apparatus for producing a pulverulent hydraulic binder, preferably cement or the like, containing bituminous constituents, comprising a closed mixing chamber, a horizontal injector pipe leading into said chamber, a compressed air exhaust communicating with said injector pipe for pneumatically feeding the pulverulent material into said mixing chamber, means on said injector pipe for dispersing said material in said chamber in form of a cloud or mist and means for atomizing liquefied bituminous material and dispersing the same in said closed chamber, said last named means being arranged relative to one another so that the direction of the atomizing current coincides with the longitudinal feeding direction of the pulverulent material, and comprising two diametrically opposed atomizing nozzles arranged close to the dispersing means of said injector pipe and flush with the central longitudinal line thereof.

2. An apparatus for producing a pulverulent hydraulic binder, preferably cement or the like, containing bituminous constituents, comprising a closed mixing chamber, means for pneumatically feeding pulverulent hydraulic material toward said chamber, means for dispersing said material in said chamber in form of a cloud or mist, and atomizing means for dispersing liquefied bituminous material in said closed chamber, said two last named means being so arranged relative to one another that the direction of the atomizing current coincides with the longitudinal feeding direction of the pulverulent hydraulic material, and said atomizing means for the liquefied bituminous material comprising a tube formed with a nozzle and submerged in the liquefied material and a second compressed air feed tube formed with a nozzle at a right angle to the first, and heating means for heating the compressed air passing through said second nozzle.

3. A method of producing a pulverulent hydraulic binder having bituminous constituents, consisting in injecting pulverulent material in form of a mist or cloud into a closed chamber, atomizing liquefied bituminous material and forcing the same by heated currents of compressed air into said closed chamber at both sides of the current of the pulverulent material so that said currents will coincide with the feed direction of said pulverulent material, whereby said bituminous material will be deposited in form of a fine film on the individual particles of the hydraulic material.

4. A method of producing a pulverulent hydraulic binder having bituminous constituents, consisting in dispersing into a mixing chamber a pulverulent hydraulic material in form of a cloud and in dispersing into said chamber an atomized bituminous substance in form of a cloud so that the particles of the latter will be deposited onto the particles of the hydraulic material in form of a fine film.

5. An apparatus for producing a pulverulent hydraulic binder having bituminous constituents, comprising a mixing chamber, means for feeding said pulverulent hydraulic material toward said chamber having means for dispersing the same into said chamber in form of a mist or cloud, means for atomizing liquefied bituminous material and dispersing same into said chamber in form of a mist or cloud, so that said bituminous material will become deposited as a fine film on the particles of the hydraulic material, collecting means in said chamber, and means for conveying the mixture precipitating on the bottom of said chamber to said collecting means.

6. An apparatus for producing a pulverulent hydraulic binder having bituminous constituents, comprising a mixing chamber, means for feeding said pulverulent hydraulic material toward said chamber having means for dispersing the same into said chamber in form of a mist or cloud, means for atomizing liquefied bituminous material and dispersing same into said chamber in form of a mist or cloud, so that said bituminous material will become deposited as a fine film on the particles of the hydraulic material, collecting means in said chamber, means for conveying the mixture precipitating on the bottom of said chamber to said collecting means, air filtering means communicating with said chamber, and means for collecting the particles of the mixture remaining in said filtering means.

7. A method of producing a pulverulent hydraulic binder consisting in the separate atomization of the different constituents of the binder and in the mixing of the clouds formed by said atomized substances.

8. A method of producing a pulverulent hydraulic binder consisting in the separate atomization of Portland cement and accessories and in the mixing of the clouds formed by said atomized substances.

9. The method of producing a pulverulent hydraulic binding medium containing uniformly distributed bituminous constituents which consists in producing an atomized fog of the bituminous constituents and injecting particles of pulverulent hydraulic binding medium into said fog to effect uniform distribution of the bituminous constituents throughout the hydraulic binding agent.

10. The method of producing a pulverulent hydraulic binding medium containing bituminous constituents uniformly distributed throughout the said medium which consists in injecting pulverulent binding medium into an atmosphere of atomized bituminous constituents.

11. The method of producing a pulverulent hydraulic binding medium containing uniformly distributed bituminous constituents which comprises injecting a cloud of pulverulent binding medium into an atomized fog of the bituminous constituents.

12. The method of producing a pulverulent hydraulic binding medium containing uniformly distributed bituminous constituents which consists in injecting a pulverulent cloud of cement into an atmosphere of atomized bitumen.

13. The method of producing a pulverulent hydraulic binding medium containing uniformly distributed bituminous constituents, which comprises injecting a bituminous substance into a chamber in atomized form and simultaneously spraying into said chamber a pulverulent hydraulic binding medium the said bituminous substance and the said binding medium being introduced into the chamber by means of jets similarly directed.

14. A method of producing a puverulent building material consisting in the separate atomization of the different constituents of said material and in the mixing of the clouds formed by said atomized substance.

15. A method of producing a pulverulent building material consisting in the separate atomization of the base substance and of the accessories of said material to form separate clouds and in the intimate mixing of said clouds one with the other.

16. In the method of producing a pulverulent medium the steps of simultaneously atomizing a pulverulent medium and a bituminous material to form clouds thereof, and intimately intermingling the clouds thus formed to effect uniform distribution with each other.

17. In an apparatus of the type described the combination comprising a mixing chamber, compressed air means for atomizing a pulverulent medium and discharging it into said chamber, and compressed air means for atomizing a bituminous material and discharging it into said chamber in intimate mixture with the atomized pulverulent medium.

18. A pulverulent cementitious composition having the hydraulic properties of a substantially pure hydraulic cement and being, when set, insensitive to shocks and temperature changes, said composition being composed of an inorganic pulverulent hydraulic binding medium and organic material consisting substantially of a bituminous substance, the composition consisting of an intimate mixture of said substances in which the bituminous substances are so extraordinarily uniformly and finely distributed that said mixture will on sifting pass through the finest mesh sieve through which ordinary Portland cement can pass.

ALBERT SOMMER.